UNITED STATES PATENT OFFICE.

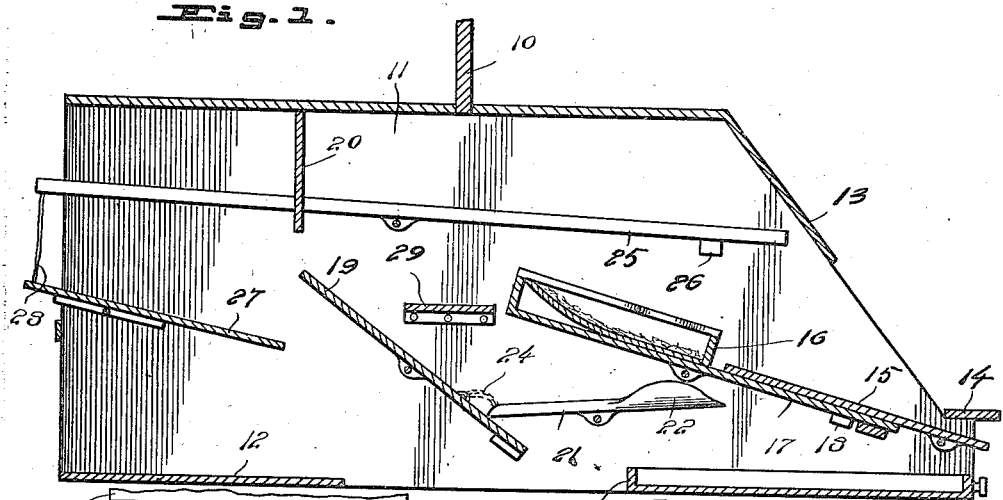
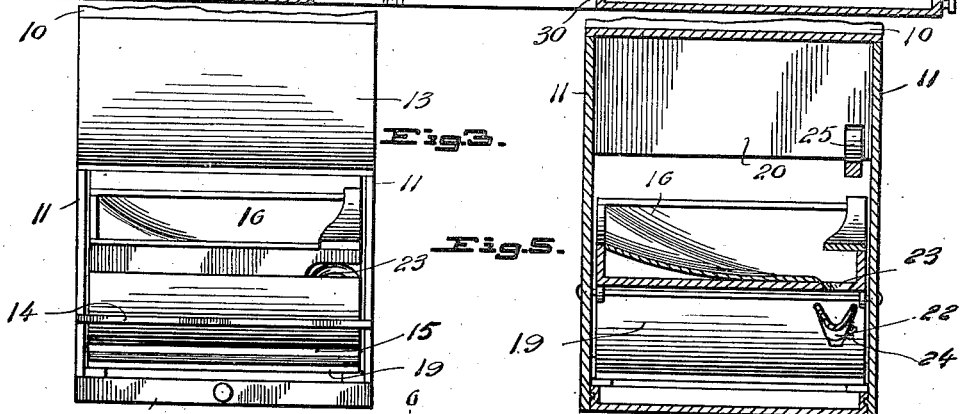
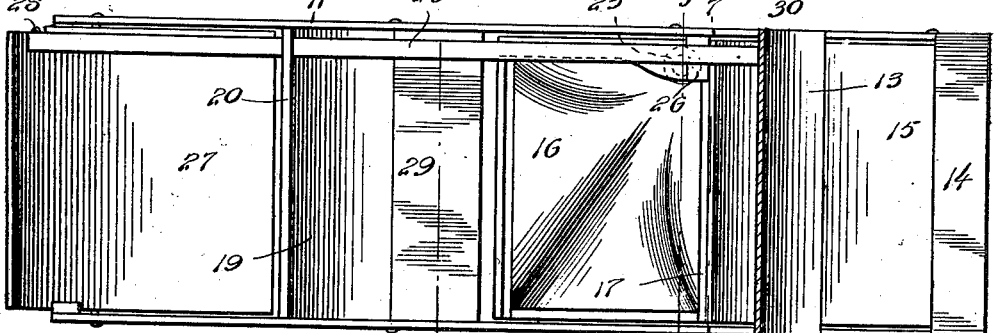

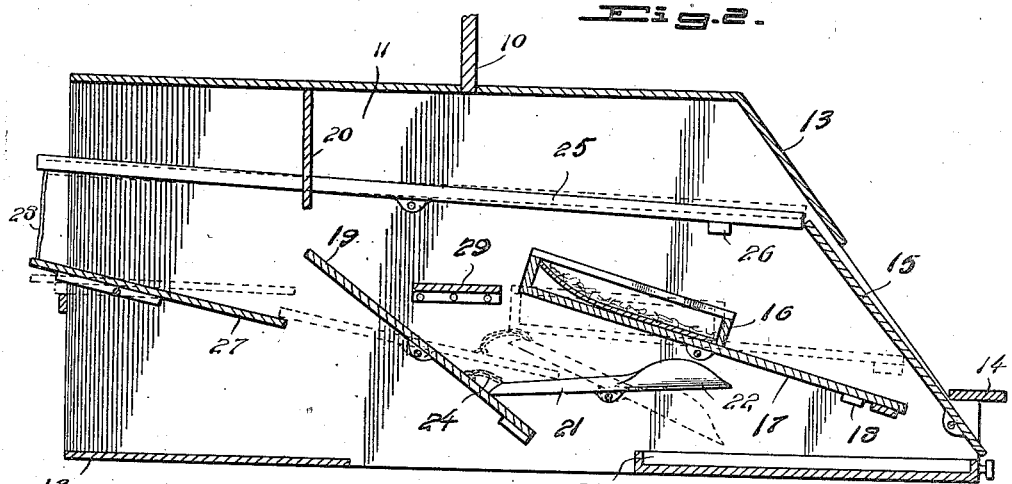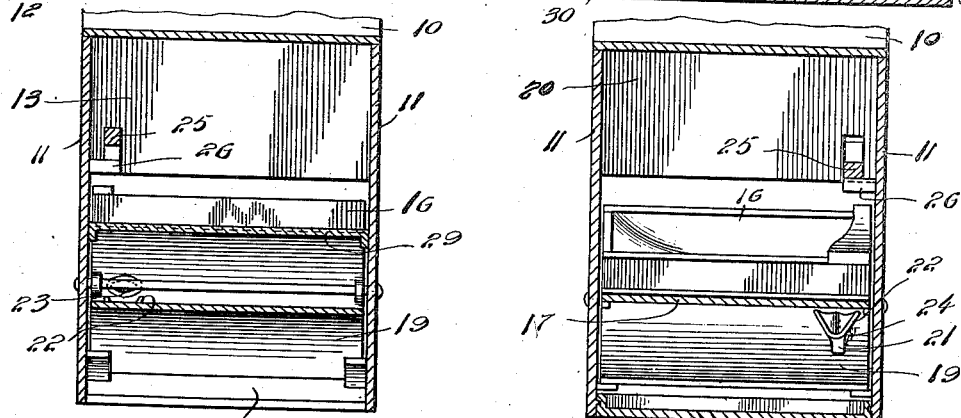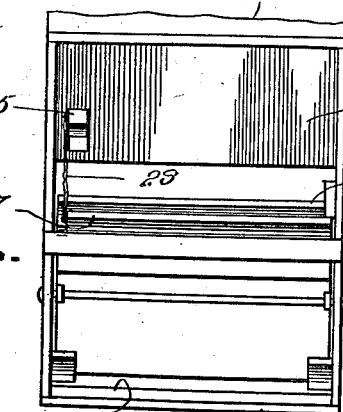

LEVI DOWNS, OF MONTICELLO, NEW YORK.

TRAP-NEST.

1,093,550.

Specification of Letters Patent. Patented Apr. 14, 1914.

Application filed April 9, 1913. Serial No. 760,038.

*To all whom it may concern:*

Be it known that I, LEVI DOWNS, a citizen of the United States, residing at Monticello, in the county of Sullivan, State of New York, have invented certain new and useful Improvements in Trap-Nests; and I do hereby declare the following to be a full, clear, and exact description of the invention, such as will enable others skilled in the art to which it appertains to make and use the same.

This invention relates to improvements in hens' nests and particularly to trap nests.

The principal object of the invention is to provide a nest of this character which will close when the hen enters and sits on the nest, and which can only be opened by the deposit of an egg.

Another object is to provide a nest of this character which when the hen has laid the egg, her passage from the nest will reset the nest in open position for the next hen.

Other objects and advantages will be apparent from the following description when taken in connection with the accompanying drawings.

In the drawings: Figure 1 is a vertical longitudinal sectional view through the trap showing the parts in open position. Fig. 2 is a similar view showing the parts in closed position. Fig. 3 is an end view taken from the entrance end showing the parts open. Fig. 4 is a plan view of the trap nest open. Fig. 5 is a vertical transverse sectional view on the line 5—5 of Fig. 4. Fig. 6 is a vertical transverse sectional view on the line 6—6 of Fig. 4. Fig. 7 is a vertical transverse sectional view on the line 7—7 of Fig. 4. Fig. 8 is an elevation of the exit end of the trap nest.

Referring particularly to the accompanying drawings, the trap nest is a box-like structure which is placed on the floor of the hen house and disposed through an opening in the wall 10 between two rooms of the house. The nest includes the parallel side walls 11, and a bottom 12, the entrance end of the trap being provided with a transverse connecting strip 13, and a ledge or sill 14, the latter of which is provided for the hen to step upon to enter the nest. Pivoted in the side walls adjacent and below the sill 14 is a vertically moving door 15, the forward end of which is disposed under the said sill, so that when the hen enters the nest, she will not trip the door and cause the same to close. Pivoted to the rear of the door 15 is the nest proper 16, this nest having a forward extension 17 which rests on a transverse stop 18, when in normal position, to support the inner end of the beforementioned door 15. This supports the weight of the hen when she enters the nest to prevent movement of any of the parts. At the rear of the nest 16 is pivoted another door 19, the rear free end of which is adapted to move toward and away from a depending cross strip 20 secured between the upper portions of the side walls 11. Pivoted below the nest 16 is a bar 21, the forward end of which carries a cup 22, this cup being disposed immediately below an opening 23 in one of the forward corners of the nest 16, to receive the egg deposited in the nest. The bottom of the nest 16 inclines downwardly toward this opening 23, so that the egg will roll to that corner and pass out through the opening. The rear end of the bar 21 is connected to the forward end of the door 19 by means of a flexible element, as the chain 24.

Extending longitudinally along the inner side and near the upper edge of one of the walls 11 is a detent bar 25, this bar being pivoted at a point approximately above the pivot of the door 19, the forward end of this bar normally resting on a cross bar 26. The rear end of this bar is connected to the rear end of a pivoted platform 27 by means of a flexible element 28. A small platform is arranged transversely just at the rear of the nest 16 for the hen to step upon when she passes from the nest, this platform being indicated by the reference character 29.

Below the door 15 is arranged a sliding drawer 30, which receives the eggs deposited by the cup 22, this drawer being arranged to be pulled through the front of the trap nest.

Assuming the parts to be in the condition indicated in Fig. 1, the hen walks over the sill 14, the door 15 and enters the nest 16. The weight of the hen in the nest 16 causes the nest to rock on its pivot, the forward end of the extension 17 raising the door 15 until the rear end of said door engages the forward end of the bar 25, which holds the door in elevated or closed position. When the hen deposits the egg in the nest, the egg rolls through the opening 23 into the cup 22, the weight of the egg causing the bar 21 to rock on its pivot and deposit the egg in the drawer 30. The rocking of the bar 21 causes the tilting of the rear door 19, by means of the flexible connection 24. The rear door 19 is now open, but the front door 15 remains closed, and the only means of exit for the hen is through the rear of the nest into the room at the other side of the partition 10. As the hen leaves the trap, she steps on the rear end of the platform 27, her weight causing the rocking of the bar 25, and the release of the forward end of said bar from the door 15, permitting the said door to fall into open position. The trap is then ready for the next hen.

From the foregoing it will readily be seen that when the hen enters and sits in the nest 16, she is confined therein and can only release herself by laying an egg. Such a device as this insures the laying of the eggs where they can be easily found, and protects the eggs so that they can be gathered.

What is claimed is:

A trap nest comprising a box disposed between rooms of a hen house, a nest proper pivoted in one end of the box, a door pivoted in the forward end of the box and arranged to move vertically, an extension on the nest for engaging the door to close the same when the nest is rocked on its pivot, a pivoted platform at the opposite end of the box, a longitudinally extending bar pivoted in one side of the box and pivotally connected to the said platform, a vertically, moving pivoted door between the nest and the platform, the free end of said bar being arranged to be engaged by the first mentioned door to hold the door in closed position, the bottom of the said nest having an egg exit opening, a member pivoted below the nest and connected to the second mentioned door, and an egg receiving cup carried by the member and disposed below the egg opening of the nest whereby, when an egg is deposited in the nest the same will be received in the cup and cause the tilting of the same to release the said second door and permit the hen to pass from the trap.

In testimony whereof, I affix my signature, in the presence of two witnesses.

LEVI DOWNS.

Witnesses:
S. S. McLaughlin,
Geo. M. Gillette.